United States Patent
Tabata et al.

(10) Patent No.: US 10,556,373 B2
(45) Date of Patent: Feb. 11, 2020

(54) CONTAINER PRODUCTION METHOD BY LIQUID BLOW MOLDING

(71) Applicants: Shinichi Tabata, Tokyo (JP); Yusuke Ishii, Tokyo (JP)

(72) Inventors: Shinichi Tabata, Tokyo (JP); Yusuke Ishii, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 16/085,986

(22) PCT Filed: Jan. 23, 2017

(86) PCT No.: PCT/JP2017/002158
§ 371 (c)(1),
(2) Date: Sep. 17, 2018

(87) PCT Pub. No.: WO2017/168996
PCT Pub. Date: Oct. 5, 2017

(65) Prior Publication Data
US 2019/0232545 A1    Aug. 1, 2019

(30) Foreign Application Priority Data
Mar. 31, 2016 (JP) ................. 2016-072582

(51) Int. Cl.
B29C 49/46 (2006.01)
B29C 49/12 (2006.01)
(Continued)

(52) U.S. Cl.
CPC .............. B29C 49/12 (2013.01); B29C 49/46 (2013.01); B29C 49/06 (2013.01); B29C 49/14 (2013.01);
(Continued)

(58) Field of Classification Search
CPC ............ B29C 49/46; B29C 2049/4664; B29C 49/4273
See application file for complete search history.

(56) References Cited

U.S. PATENT DOCUMENTS

2014/0069937 A1* 3/2014 Melrose ............... B65D 79/005
220/609
2015/0076105 A1* 3/2015 Sato ..................... B65D 1/0261
215/381

FOREIGN PATENT DOCUMENTS

| CN | 100588593 C | 2/2010 |
|----|-------------|--------|
| CN | 104136195 A | 11/2014 |

(Continued)

OTHER PUBLICATIONS

Mar. 7, 2017 International Search Report issued in International Patent Application No. PCT/JP2017/002158.
(Continued)

*Primary Examiner* — Robert B Davis
(74) *Attorney, Agent, or Firm* — Oliff PLC

(57) ABSTRACT

A container production method by liquid blow molding. The method includes a head space forming step of forming a head space in the upper portion of a container, in which, with the container disposed in a cavity, a bottom panel portion molded into an upward convex shape on a bottom of the container is inverted by pushing it down with a pushing rod and is plastically deformed into a downward convex shape.

12 Claims, 4 Drawing Sheets

(51) Int. Cl.
  *B29C 49/06*  (2006.01)
  *B29C 49/14*  (2006.01)
  *B29C 49/54*  (2006.01)
  *B29K 67/00*  (2006.01)
  *B29C 49/48*  (2006.01)
  *B29K 23/00*  (2006.01)

(52) U.S. Cl.
  CPC .... *B29C 49/541* (2013.01); *B29C 2049/4602* (2013.01); *B29C 2049/4664* (2013.01); *B29C 2049/4807* (2013.01); *B29C 2049/4892* (2013.01); *B29K 2023/12* (2013.01); *B29K 2067/003* (2013.01)

(56) References Cited

FOREIGN PATENT DOCUMENTS

| | | |
|---|---|---|
| CN | 104321270 A | 1/2015 |
| EP | 2354018 A1 | 8/2011 |
| EP | 2832682 A1 | 2/2015 |
| JP | 2006-501109 A | 1/2006 |
| JP | 2011218722 A | 11/2011 |
| JP | 2014-028485 A | 2/2014 |
| WO | 2013/099108 A1 | 7/2013 |
| WO | 2013/147065 A1 | 10/2013 |
| WO | 2016/017082 A1 | 2/2016 |

OTHER PUBLICATIONS

Oct. 2, 2018 International Preliminary Report on Patentability issued in International Patent Application No. PCT/JP2017/002158.
Sep. 10, 2019 Office Action issued in Japanese Patent Application No. 2016-072582.
Sep. 19, 2019 Extended European Search Report issued in European Patent Application No. 17773546.1.
Nov. 19, 2019 Office Action issued in Japanese Patent Application No. 2016-072582.
Dec. 13, 2019 Office Action issued in Chinese Patent Application No. 201780019087.9.

* cited by examiner

CONTAINER PRODUCTION METHOD BY LIQUID BLOW MOLDING

TECHNICAL FIELD

The present disclosure relates to a container production method of producing a container by liquid blow molding in which a pressurized liquid is supplied into a preform to form the preform into a shape conforming to an inner surface of a cavity of a blow molding mold.

BACKGROUND

Resin containers, typical examples of which are polypropylene (PP) bottles and polyethylene terephthalate (PET) bottles, are used to hold a variety of liquids, such as a beverage, a cosmetic product, a pharmaceutical product, a detergent, and a toiletry including shampoo, as the content liquids. Such a container is generally produced by blow molding a preform that has been formed by a thermoplastic resin material as mentioned above.

As an example of blow molding in which a pressurizing medium is supplied into a preform to mold the preform into a container of a shape conforming to an inner surface of a cavity of s blow molding mold, liquid blow molding in which a liquid is used as a pressurizing medium is known.

Further, as described in PTL1, for example, a container production method is known in which, during liquid blow molding, as a pressurizing medium, a content liquid to be held in a container is supplied to a preform when a container is produced. Thus a step of filling a content liquid into a molded container is omitted, and a production step and molding and filling lines can be simplified.

CITATION LIST

Patent Literature

PTL 1: JP2014028485A

SUMMARY

Technical Problem

As described above, when a content liquid is used as a pressurizing medium for the liquid blow molding, it is desirable that, when a container containing a content liquid is molded, a properly sized head space is formed in the upper portion of the container to prevent the content liquid from spilling out. In particular, when a cap for a discharge apparatus with pump is attached to a mouth of the container in a capping step after container is molded, a pump mechanism is inserted into the container, thus a larger head space is required compared to that required for attaching a tubular portion of a spout plug or a closing cap.

In order to form a head space of a desirable size depending on a subject to be attached to a mouth of a container, PTL1 states that, as a blow molding mold, one having a bottom mold portion that forms, on the bottom of its cavity, an inner surface being formed into an upward convex shape and having a locking portion is used. Further, it states that, after the preform is molded into a container of a shape conforming to the inner surface of the cavity, the bottom mold portion is moved downward and the bottom of the container is pulled by the locking portion such that the bottom is inverted downward and is plastically deformed into a downward convex shape, and simultaneously, air is introduced into the container, thus a head space is formed in the upper portion of the container.

However, in the container production method by liquid blow molding as described in PTL 1, it is difficult to realize a stabilized locking between the bottom mold portion and the bottom of the container, and there is room for improvement in producing a container having a head space of a desirable size easily and stably.

The present disclosure has been conceived in view of the above problem, and the present disclosure is to provide a container production method by liquid blow molding in which a container containing a content liquid that includes a head space of a desirable size can be produced easily and stably.

Solution to Problem

In the disclosed container production method by liquid blow molding, as a blow molding mold, one having a bottom mold portion that forms an upward convex inner surface on the bottom of its cavity is used. The method includes a liquid blow molding step in which a pressurized liquid is supplied into a resin preform to form the preform into a container of a shape conforming to the inner surface of the cavity, and a head space forming step of forming a head space in the upper portion of the container in which, with the container disposed in the cavity, a bottom panel portion molded into an upward convex shape on the bottom of the container is inverted by pushing it down with a pushing rod inserted from a mouth of the container and is plastically deformed into a downward convex shape, and simultaneously air is introduced into the container.

Further, in a preferred embodiment of the disclosed container production method by liquid blow molding, in the head space forming step, the bottom panel portion molded into an upward convex shape is inverted and plastically deformed into a downward convex shape while being sandwiched between the pushing rod and the bottom mold portion.

Further, in another preferred embodiment of the disclosed container production method by liquid blow molding, in the head space forming step, after the bottom mold portion is moved downward relative to the bottom panel portion molded into an upward convex shape, the bottom panel portion is inverted by pushing it down with the pushing rod, brought into contact with the bottom mold portion, and is plastically deformed into a downward convex shape.

Further, in yet another preferred embodiment of the disclosed container production method by liquid blow molding, in the liquid blow molding step, the preform is formed into a container of a shape conforming to the inner surface of the cavity by the biaxial stretch blow molding in which the pushing rod is used as a stretching rod.

Moreover, in still another preferred embodiment of the disclosed container production method by liquid blow molding, as the bottom mold portion, one that includes a bottom mold portion body and a pick pin vertically movable relative to the bottom mold portion body is used, and in the liquid blow molding step, the preform is molded into a container of a shape conforming to the inner surface of the cavity with a bottom of the preform supported with the pick pin.

Advantageous Effect

In the present disclosure, with a container disposed inside a cavity, a bottom panel portion molded into an upward convex shape on the bottom of the container is inverted by pushing it down with a pushing rod and is plastically deformed into a downward convex shape. Thus a head space can be formed in the upper portion of the container.

Therefore, according to the disclosed container production method by liquid blow molding, a content liquid-containing container having a head space of a desirable size can be easily and stably produced.

DETAILED DESCRIPTION

The present disclosure will be described in detail below with reference to the drawings.

In the disclosed container production method by liquid blow molding (hereinafter simply referred to also as a "container production method"), as a blow molding mold, one having a bottom mold portion that forms an upward convex inner surface on the bottom of its cavity is used. The method includes a liquid blow molding step in which a pressurized liquid is supplied into a resin preform to form the preform into a container of a shape conforming to the inner surface of the cavity; and a head space forming step of forming a head space in the upper portion of the container, in which, with the container disposed in the cavity, a bottom panel portion molded into an upward convex shape on the bottom of the container is inverted by pushing it down with a pushing rod inserted from a mouth of the container and is plastically deformed into a downward convex shape, and simultaneously air is introduced into the container.

The disclosed container production method can be performed by using a liquid blow molding apparatus 1 as illustrated in FIGS. 1 to 4, for example.

The liquid blow molding apparatus 1 illustrated in FIGS. 1 to 4 produces a content liquid-containing container C that includes a head space HS by subjecting a preform PF to liquid blow molding. The liquid blow molding is a blow molding in which a pressurized liquid (pressurized liquid L) is supplied into the preform PF to mold the preform PF into a container C of a shape conforming to the inner surface of the cavity 12 of a blow molding mold 11.

As the pressurized liquid L, a liquid to be contained as a content liquid in the container C is used. Examples of such a liquid include a beverage, a cosmetic product, a pharmaceutical product, a detergent, and a toiletry including shampoo.

The preform PF can be obtained through injection molding, direct blow molding, extrusion molding and the like, by using thermoplastic resins such as polypropylene (PP) and polyethylene terephthalate (PET) as materials. The preform PF may be formed into a substantially test tube shape including a cylindrical mouth PFa and a bottomed cylindrical trunk PFb connecting to the mouth PFa.

It is to be noted that the preform PF can be changed into various shapes as long as it can be liquid blow molded into a content liquid-containing container C.

Further, a male screw (not illustrated) is provided to the outer wall of the mouth PFa to screw a mounting cap of a discharge apparatus with pump into a mouth Ca of the content liquid-containing container C after being molded. It is to be noted that, instead of a male screw, an engagement portion (undercut portion) for fitting may be provided to the outer wall of the mouth PFa to allow for capping. Further, other than such a mounting cap for the discharge apparatus with pump, a mounting tubular portion for a spout plug or a closing cap may be attached to the mouth Ca of the container C.

Figure 1:
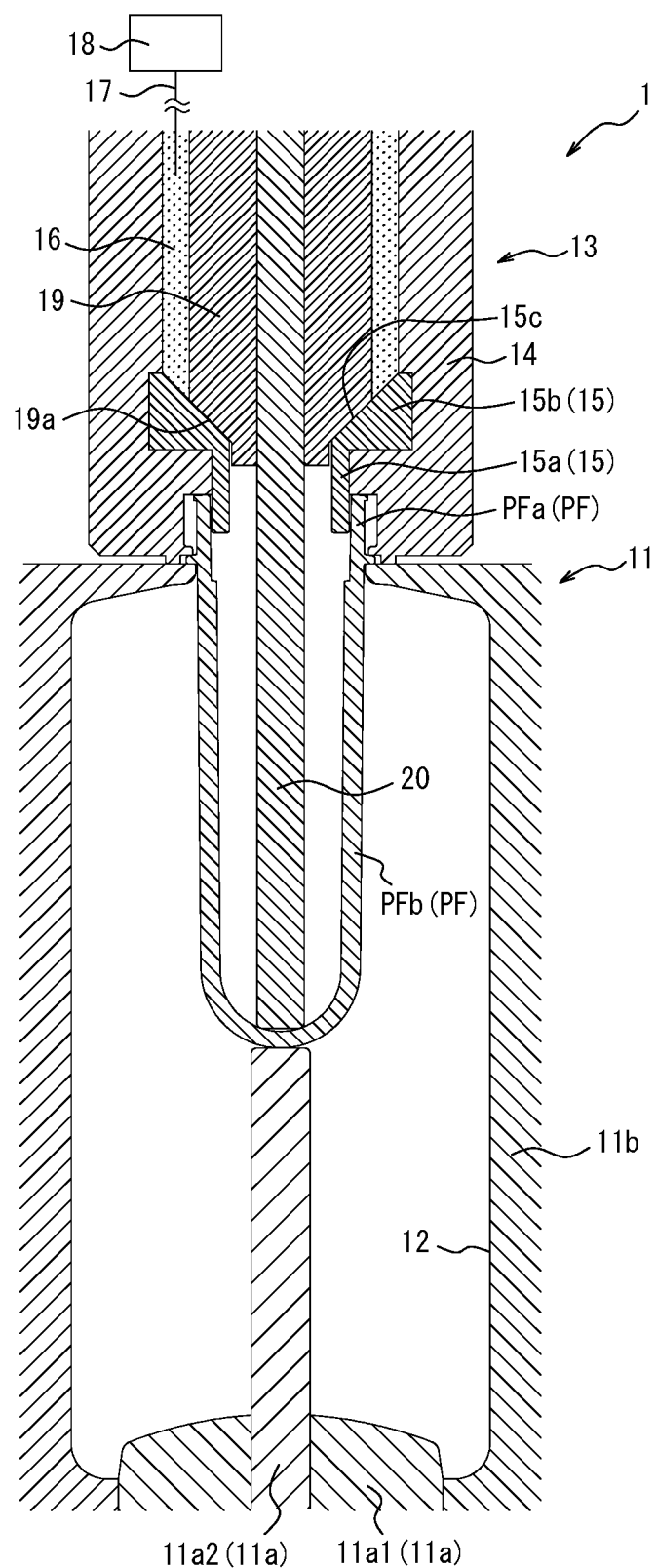
FIG. 1 illustrates a state before a liquid is supplied in a liquid blow molding step of a container production method by liquid blow molding according to one embodiment of the present disclosure.

As illustrated in FIG. 1, the preform PF can be, after being heated to a predetermined temperature at which the stretching characteristics are expressed by using a heater or the like, disposed in the blow molding mold 11 in a standing posture where the mouth PFa protrudes upward from the cavity 12.

The liquid blow molding apparatus 1 has a blow molding mold 11 that includes a cavity 12. In the illustrated example, the cavity 12 is formed into a bottle shape, and opens upward on an upper surface of the blow molding mold 11.

Further, the blow molding mold 11 has a bottom mold portion 11a that forms an upward convex inner surface on the bottom of the cavity 12. Further, although not illustrated in detail, an outer peripheral mold portion 11b formed of the portion excluding the bottom mold portion 11a of the blow molding mold 11 can be opened left and right, and the content liquid-containing container C can be taken out from the blow molding mold 11 by opening the outer peripheral mold portion 11b.

In the illustrated example, the bottom mold portion 11a has a bottom mold portion body 11a1 and a pick pin 11a2 vertically movable along the axial center of the cavity 12 relative to the bottom mold portion body 11a1.

Figure 3:
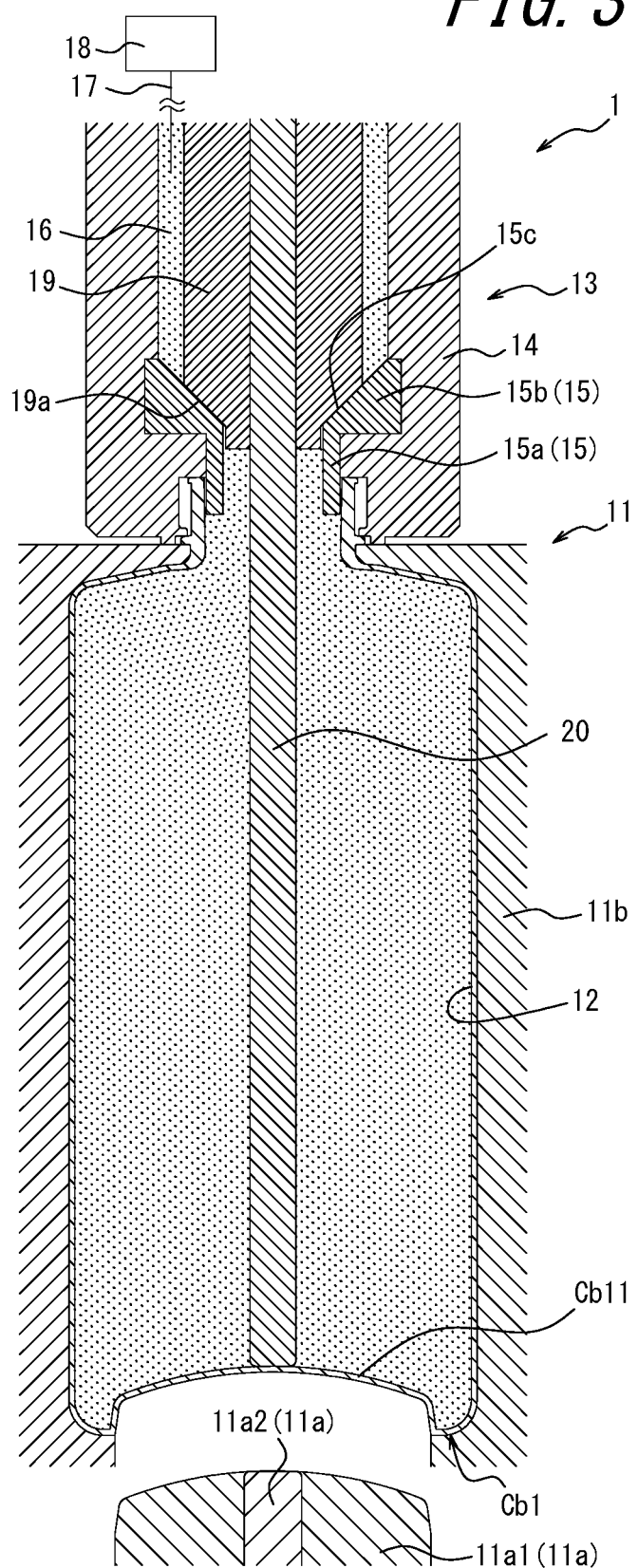
FIG. 3 illustrates a state where a bottom mold portion is retracted in a head space forming step of the container production method by liquid blow molding according to one embodiment of the present disclosure.

Further, in the illustrated example, the bottom mold portion 11a forms a domed inner surface including a top surface with the center bulged upward and a periphery hanging down from an outer peripheral edge of the top surface, and is vertically movable relative to the outer peripheral mold portion 11b. Therefore, as illustrated in FIG. 3, the bottom mold portion 11a moves downward with respect to the outer peripheral mold portion 11b, and thus can retract from a bottom panel portion Cb11 molded into an upward convex shape on the bottom of the container C.

It is to be noted that the shape of the inner surface of the bottom mold portion 11a can be changed into various shapes as long as a bottom panel portion Cb11 of an upward convex shape that is invertible by pushing it down with a pushing rod 2 described below can be liquid blow molded on the bottom Cb1 of the container C. Further, movement of the bottom mold portion 11a is not limited to downward movement as long as it can retract from the bottom panel portion Cb11 of the container C.

A nozzle unit 13 is provided above the blow molding mold 11 such that it is vertically movable relative to the blow molding mold 11. The nozzle unit 13 includes a body block 14 and a blow nozzle 15.

The blow nozzle 15 is configured by integrally forming, by using for example steel or resin material, a nozzle body 15a formed into a cylindrical shape and inserted into the mouth PFa of the preform PF and a large-diameter holding portion 15b integrally formed with the nozzle body 15a, and is fixed to the body block 14 by fitting the holding portion 15b into the inner surface of the body block 14.

The nozzle body 15a is disposed coaxially with the cavity 12 of the blow molding mold 11 and is configured, when the nozzle unit 13 goes down to a predetermined position, to engage with the mouth PFa of the preform PF attached to the blow molding mold 11.

A supply path 16 extending coaxially with the nozzle body 15a in the vertical direction is provided inside the body block 14. The supply path 16 is connected to the blow nozzle 15 at the lower end thereof.

A pressurized liquid supply portion 18 is connected to the supply path 16 through a piping 17. The pressurized liquid supply portion 18 can supply a pressurized liquid L pressurized to a specific pressure to the supply path 16 through the piping 17.

Figure 2:
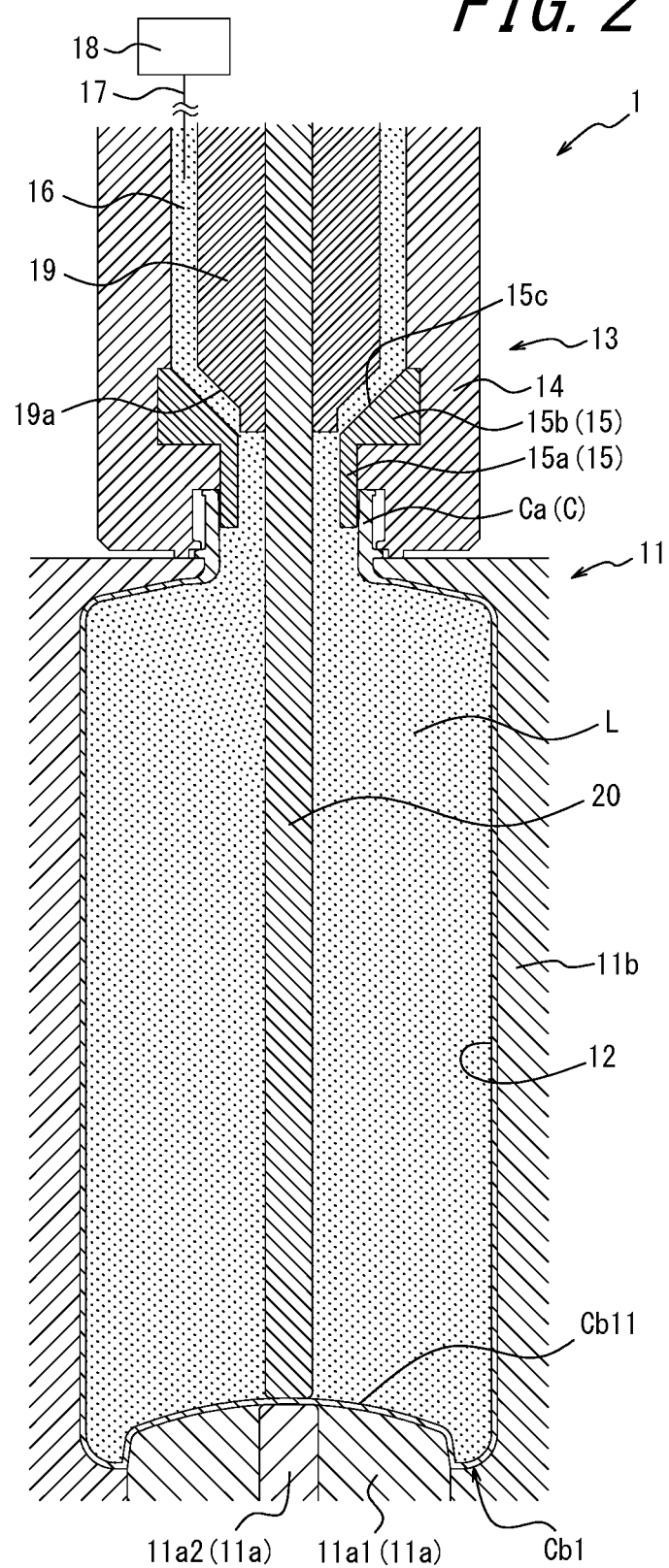
FIG. 2 illustrates a liquid supply state in the liquid blow molding step of the container production method by liquid blow molding according to one embodiment of the present disclosure.

When the pressurized liquid L is supplied from the pressurized liquid supply portion 18 to the supply path 16, as illustrated in FIG. 2, the pressurized liquid L is supplied from the supply path 16 through the blow nozzle 15 into the preform PF disposed in the blow molding mold 11. Thus, the preform PF is liquid blow molded by the pressurized liquid L into the container C of a shape conforming to the cavity 12 of the blow molding mold 11.

As the pressurized liquid supply portion 18, one that is configured to employ a plunger pump as a pressure source, for example, is used.

A seal pin 19 for opening and closing the supply path 16 with respect to the blow nozzle 15 is disposed in the supply path 16. The seal pin 19 is formed into a columnar shape extending along the axial center of the supply path 16, and is vertically movable relative to the body block 14 in the supply path 16. On the other hand, a tapered closing surface 15c is provided over the holding portion 15b of the blow nozzle 15. When the seal pin 19 moves down to the stroke end and a tapered surface 19a provided at the lower end of the seal pin 19 comes into contact with the closing surface 15c, communication between the supply path 16 and the nozzle body 15a is blocked by the seal pin 19, and the supply path 16 is closed with respect to the blow nozzle 15. On the other hand, when the seal pin 19 moves upward and the tapered surface 19a provided at the lower end of the seal pin 19 separates from the closing surface 15c, the supply path 16 and the nozzle body 15a are communicated with each other and the supply path 16 is opened with respect to the blow nozzle 15, that is, is an opened state.

Therefore, as illustrated in FIG. 2, the pressurized liquid supply portion 18 is operated with the nozzle body 15a engaged with the mouth PFa of the preform PF, the seal pin 19 opened and the supply path 16 communicated with the blow nozzle 15. Thus the pressurized liquid L is supplied from the pressurized liquid supply portion 18 into the preform PF through the supply path 16 and the blow nozzle 15, and the preform PF can be liquid blow molded. Consequently, the container C of a shape conforming to the inner surface of the cavity 12 of the blow molding mold 11 can be molded by the liquid blow molding.

Further, as illustrated in FIG. 3, after the liquid blow molding, the seal pin 19 is closed with the pressurized liquid supply portion 18 stopped to block communication between the supply path 16 and the blow nozzle 15, and the bottom mold portion 11a is moved downward with respect to the outer peripheral mold portion 11b. Thus the bottom mold portion 11a can be retracted from the bottom panel portion Cb11 of the container C while liquid flow from the supply path 16 into the container C is blocked.

Figure 4:
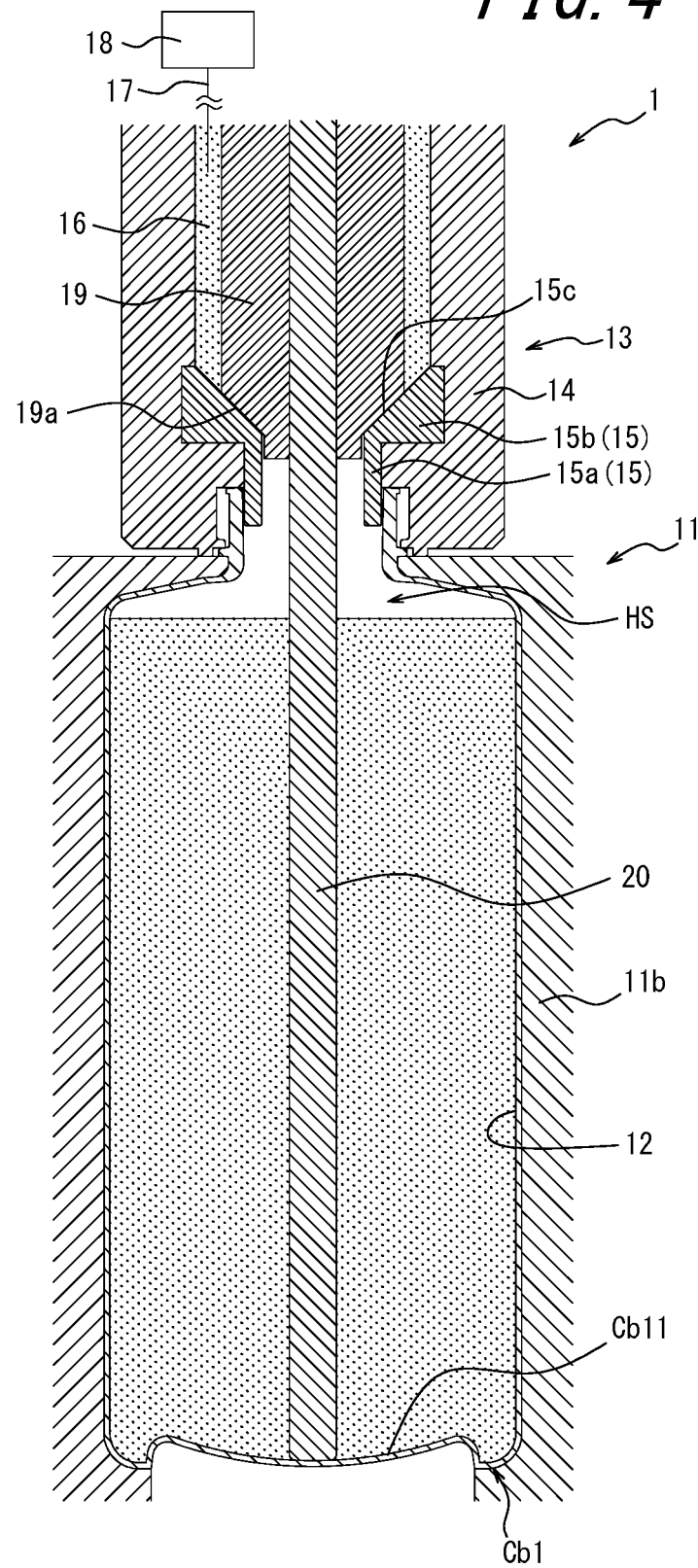
FIG. 4 illustrates a state where a head space is formed in an upper portion of the container in the head space forming step of the container production method by liquid blow molding according to one embodiment of the present disclosure.

A pushing rod 20 is slidably attached to an insertion hole formed in the center of the seal pin 19. It is to be noted that, in the illustrated example, the pushing rod 20 is configured so that it can be used also as a stretching rod for the biaxial stretch blow molding as described later. The pushing rod 20 is vertically (axially) movable relative to the seal pin 19, and as illustrated in FIG. 4, when the pushing rod 20 moves downward (to the bottom of the cavity 12) with respect to the seal pin 19 after the bottom mold portion 11a is retracted, it pushes down the bottom panel portion Cb11 molded into an upward convex shape on the bottom of the container C to invert it and thus plastically deform it into a downward convex shape.

Further, although not illustrated in detail, the liquid blow molding apparatus 1 is provided with a ventilation path for introducing air into the container C when the bottom panel portion Cb11 is inverted by pushing it down with the pushing rod 20. The ventilation path may be provided in the blow nozzle 15, the body block 14, the pushing rod 20 or the seal pin 19. Further, such an air introducing configuration of the liquid blow molding apparatus 1 can be changed in various manners as long as air can be introduced into the container C when the bottom panel portion Cb11 is inverted by pushing it down with the pushing rod 20. For example, instead of providing a ventilation path, air may be introduced into the container C by moving the nozzle unit 13 upward with respect to the blow molding mold 11.

Therefore, the liquid blow molding apparatus 1 can form a head space HS in the upper portion of the container C by, with the bottom mold portion 11a retracted, pushing down the bottom panel portion Cb11 molded into an upward convex shape on the bottom of the container C with the pushing rod 20 to invert and plastically deform it into a downward convex shape, and simultaneously by introducing air into the container C.

It is to be noted that the head space HS formed in the aforementioned manner is further extended by removing the pushing rod 20 from the container C.

In the illustrated example, the liquid blow molding apparatus 1 is configured to use the pushing rod 20 as a stretching rod for the biaxial stretch blow molding. Therefore, as illustrated in FIGS. 1 and 2, the pushing rod 20 moves downward (to the bottom of the cavity 12) with respect to the seal pin 19, and as a result, it pushes down the bottom of a trunk PFb of the preform PF disposed in the blow molding mold 11 so that the trunk PFb axially (vertically) stretches in the cavity 12. In other words, by using the pushing rod 20 as a stretching rod, the container C can be produced by the biaxial stretch blow molding in which the preform PF disposed in the blow molding mold 11 is radially stretched by the pressurized liquid L while being vertically stretched by using the pushing rod 20.

Further, in the illustrated example, the liquid blow molding apparatus 1 is configured to perform the biaxial stretch blow molding while supporting the bottom of the trunk PFb of the preform PF with the pick pin 11a2.

Next, a production method of the container C when the disclosed container production method by liquid blow molding is performed by using the liquid blow molding apparatus 1 configured in the aforementioned manner will be described.

First, the preform PF previously heated by a heater to a predetermined temperature (e.g. from 80 to 150° C.) at which the stretching characteristics are expressed is attached to the blow molding mold 11 and is clamped. Further, as illustrated in FIG. 1, the nozzle unit 13 is lowered to engage the blow nozzle 15 with the mouth PFa of the preform PF.

Next, the liquid blow molding step is performed. In the liquid blow molding step, as illustrated in FIGS. 1 to 2, the seal pin 19 is opened to supply the pressurized liquid L into the preform PF to mold the preform PF into a container C of a shape conforming to the inner surface of the cavity 12.

At this time, the preform PF can be molded into a container C of a shape conforming to the inner surface of the cavity 12 by the biaxial stretch blow molding in which the pushing rod 20 is used as a stretching rod. By using such a biaxial stretch blow molding, misalignment occurred during molding can be suppressed. It is to be noted that it is not necessary for the pushing rod 20 to push down the preform PF from the beginning and, after the preform PF is axially stretched to some extent by the pressurized liquid L only, it may be pushed down with the pushing rod 20 so that it is stretched further in the axial direction.

Further, at this time, the preform may be axially stretched with the bottom of the trunk PFb of the preform PF supported by the pick pin 11a2 (i.e. with the bottom thereof sandwiched between a tip of the pushing rod 20 and a tip of the pick pin 11a2), and by that, misalignment occurred during molding can be further suppressed. It is to be noted that, it is not necessary for the pick pin 11a2 to support the preform PF from the beginning, and the preform PF may be supported by the pick pin 11a2 after it is axially stretched to some extent.

When the liquid blow molding step is completed, followed thereby the head space forming step is performed. As illustrated in FIG. 3, in the head space forming step, the seal pin 19 is closed and the bottom mold portion 11a is moved downward with respect to the outer peripheral mold portion 11b. Thus the bottom mold portion 11a can be retracted from the bottom panel portion Cb11 molded into an upward convex shape on the bottom Cb1 of the container C.

Further, in the head space forming step, with the bottom mold portion 11a retracted, the bottom panel portion Cb11 molded in an upward convex shape on the bottom of the container C may be inverted by pushing it down with the pushing rod 20, and be plastically deformed into a downward convex shape.

Further, in the head space forming step, when the bottom panel portion Cb11 is inverted and plastically deformed into a downward convex shape, air is introduced into the container C to form the head space HS in the upper portion of the container C.

Further, the disclosed container production method by liquid blow molding can also be performed by a liquid blow molding apparatus configured in a different manner as that of the liquid blow molding apparatus 1 illustrated in FIGS. 1 to 4.

For example, instead of configuring the liquid blow molding apparatus 1 such that the bottom panel portion Cb11 is pushed down with the pushing rod 20 after the bottom mold portion 11a retracts from the bottom panel portion Cb11 molded in an upward convex shape on the bottom Cb1 of the container C, the liquid blow molding apparatus 1 may be configured such that the pick pin 11a2 of the bottom mold portion 11a moves downward along with the bottom panel portion Cb11 being inverted downward. When the liquid blow molding apparatus of such a configuration is used, in the head space forming step, the bottom panel portion Cb11 molded into an upward convex shape may be inverted while being sandwiched between the pushing rod 20 and the pick pin 11a2 of the bottom mold portion 11a and be plastically deformed into a downward convex shape. By such a step, the shape of the bottom panel portion Cb11 of the container C to be produced can be easily stabilized.

It is to be noted that, in this case, the bottom mold portion body 11a1 may be moved downward integrally with the pick pin 11a2, or the pick pin 11a2 may be moved downward after the bottom mold portion body 11a1 is moved downward first and is separated from the bottom panel portion Cb11 molded into an upward convex shape.

Further, the liquid blow molding apparatus 1 may be configured such that the bottom mold portion 11a is not provided with the pick pin 11a2. When the liquid blow molding apparatus configured to have such a bottom mold portion is used, in the head space forming step, the bottom panel portion Cb11 molded into an upward convex shape may be inverted while being sandwiched between the pushing rod 20 and the bottom mold portion, and be plastically deformed into a downward convex shape. Even in such a step, the shape of the bottom panel portion Cb11 of the container C to be produced can be easily stabilized.

Further, in the head space forming step, after the bottom mold portion is moved downward relative to the outer peripheral mold portion 11b, the bottom panel portion Cb11 molded into an upward convex shape may be inverted by pushing it down with the pushing rod 20, brought into contact with the bottom mold portion, and plastically deformed into a downward convex shape. In such a step, the shape of the bottom panel portion Cb11 of the container C to be produced can be easily stabilized.

Moreover, the liquid blow molding step can be performed by using the pushing rod 20 and the pressurized liquid L only without the pick pin 11a2.

Further, the liquid blow molding apparatus 1 can be configured not to use the pushing rod 20 as a stretching rod, that is, the liquid blow molding apparatus 1 can be configured such that, after axial stretching of the preform PF is completed, the pushing rod 20 comes into contact with the bottom of the preform PF or the bottom panel portion Cb11 molded into an upward convex shape on the bottom of the container C (a configuration is included in which the pushing rod 20 retracts into the seal pin 19 in the states illustrated in FIGS. 1 to 3, and the pushing rod 20 projects from the seal pin 19 for the first time and pushes down the bottom panel portion Cb11 when the bottom panel portion Cb11 inverts as illustrated in FIG. 4). When the liquid blow molding apparatus configured in the aforementioned manner is used, in the liquid blow molding step, the preform PF may be molded into the container C of a shape conforming to the inner surface of the cavity 12 by only using the pressurized liquid L and the pick pin 11a2.

Moreover, the liquid blow molding apparatus 1 can be configured not to use the pushing rod 20 as a stretching rod, and not to provide the bottom mold portion 11a with the pick pin 11a2. When the liquid blow molding apparatus configured in the aforementioned manner is used, in the liquid blow molding step, the preform PF may be molded into the container C of a shape conforming to the inner surface of the cavity 12 by only using the pressurized liquid L.

In this manner, in the present disclosure, with the container C disposed in the cavity 12, the bottom panel portion Cb11 molded into an upward convex shape on the bottom Cb1 of the container C is inverted by pushing it down with the pushing rod 20 and is plastically deformed into a downward convex shape. Thus a head space HS can be formed in the upper portion of the container C. Accordingly, a content liquid-containing container C having a head space HS of a desirable size can be easily produced.

It goes without saying that the present disclosure is not limited to the aforementioned embodiments, and various changes may be made without departing from the gist of the present disclosure.

REFERENCE SIGNS LIST

1 Liquid blow molding apparatus
11 Blow molding mold
11a Bottom mold portion
11a1 Bottom mold portion body
11a2 Pick pin
11b Outer peripheral mold portion
12 Cavity
13 Nozzle unit
14 Body block
15 Blow nozzle
15a Nozzle body
15b Holding portion
15c Closing surface
16 Supply path
17 Piping
18 Pressurized liquid supply portion
19 Seal pin
19a Tapered surface
20 Pushing rod
PF Preform
PFa Mouth of preform
PFb Trunk of preform
HS Head space
L Pressurized liquid
C Container
Ca Mouth of container
Cb1 Bottom of container
Cb11 Bottom panel portion

The invention claimed is:

1. A container production method by liquid blow molding, comprising:
   a liquid blow molding step in which, as a blow molding mold, one having a bottom mold portion that forms an upward convex inner surface on a bottom of a cavity of the mold is used, and a pressurized liquid is supplied into a resin preform to mold the preform into a container of a shape conforming to the inner surface of the cavity; and
   a head space forming step of forming a head space in an upper portion of the container, in which, with the container disposed in the cavity, a bottom panel portion molded into an upward convex shape on a bottom of the container is inverted by pushing it down with a pushing rod inserted from a mouth of the container and is plastically deformed into a downward convex shape, and simultaneously air is introduced into the container.

2. The container production method by liquid blow molding according to claim 1, wherein, in the head space forming step, the bottom panel portion molded into an upward convex shape is inverted while being sandwiched between the pushing rod and the bottom mold portion, and is plastically deformed into a downward convex shape.

3. The container production method by liquid blow molding according to claim 1, wherein, in the head space forming step, after the bottom mold portion is moved downward relative to the bottom panel portion molded into an upward convex shape, the bottom panel portion is inverted by pushing it down with the pushing rod, brought into contact with the bottom mold portion, and plastically deformed into a downwardly convex shape.

4. The container production method by liquid blow molding according to claim 1, wherein in the liquid blow molding step, the preform is molded into a container of a shape conforming to the inner surface of the cavity by a biaxial stretch blow molding in which the pushing rod is used as a stretching rod.

5. The container production method by liquid blow molding according to claim 1, wherein as the bottom mold portion, one having a bottom mold portion body and a pick pin vertically movable relative to the bottom mold portion body is used, and in the liquid blow molding step, the preform is molded into a container of a shape conforming to the inner surface of the cavity while the bottom portion of the preform is supported by the pick pin.

6. The container production method by liquid blow molding according to claim 2, wherein in the liquid blow molding step, the preform is molded into a container of a shape conforming to the inner surface of the cavity by a biaxial stretch blow molding in which the pushing rod is used as a stretching rod.

7. The container production method by liquid blow molding according to claim 3, wherein in the liquid blow molding step, the preform is molded into a container of a shape conforming to the inner surface of the cavity by a biaxial stretch blow molding in which the pushing rod is used as a stretching rod.

8. The container production method by liquid blow molding according to claim 2, wherein as the bottom mold portion, one having a bottom mold portion body and a pick pin vertically movable relative to the bottom mold portion body is used, and in the liquid blow molding step, the preform is molded into a container of a shape conforming to the inner surface of the cavity while the bottom portion of the preform is supported by the pick pin.

9. The container production method by liquid blow molding according to claim 3, wherein as the bottom mold portion, one having a bottom mold portion body and a pick pin vertically movable relative to the bottom mold portion body is used, and in the liquid blow molding step, the preform is molded into a container of a shape conforming to the inner surface of the cavity while the bottom portion of the preform is supported by the pick pin.

10. The container production method by liquid blow molding according to claim 4, wherein as the bottom mold portion, one having a bottom mold portion body and a pick pin vertically movable relative to the bottom mold portion body is used, and in the liquid blow molding step, the preform is molded into a container of a shape conforming to the inner surface of the cavity while the bottom portion of the preform is supported by the pick pin.

11. The container production method by liquid blow molding according to claim 6, wherein as the bottom mold portion, one having a bottom mold portion body and a pick pin vertically movable relative to the bottom mold portion body is used, and in the liquid blow molding step, the preform is molded into a container of a shape conforming to the inner surface of the cavity while the bottom portion of the preform is supported by the pick pin.

12. The container production method by liquid blow molding according to claim 7, wherein as the bottom mold portion, one having a bottom mold portion body and a pick pin vertically movable relative to the bottom mold portion body is used, and in the liquid blow molding step, the preform is molded into a container of a shape conforming to the inner surface of the cavity while the bottom portion of the preform is supported by the pick pin.

* * * * *